(12) United States Patent
Bright

(10) Patent No.: US 6,240,277 B1
(45) Date of Patent: May 29, 2001

(54) CELLULAR PHONE WITH CANCEL FUNCTION FOR FIXED TERMINAL DIALING

(75) Inventor: Randy Bright, Pittsboro, NC (US)

(73) Assignee: Ericsson Inc., Research Triangle Park, NC (US)

(*) Notice: Subject to any disclaimer, the term of this patent is extended or adjusted under 35 U.S.C. 154(b) by 0 days.

(21) Appl. No.: 09/034,591

(22) Filed: Mar. 4, 1998

(51) Int. Cl.⁷ .................................................. H04B 1/40
(52) U.S. Cl. .................. 455/74.1; 455/556; 455/344; 455/554; 379/434
(58) Field of Search ................................. 455/422, 554, 455/90, 575, 74, 74.01, 550, 556, 414, 344; 379/359, 355, 456, 441, 364, 434

(56) References Cited

U.S. PATENT DOCUMENTS

| | | | |
|---|---|---|---|
| 4,658,096 | 4/1987 | West et al. | 379/59 |
| 4,775,997 | * 10/1988 | West, Jr. et al. | 455/557 |
| 4,890,315 | * 12/1989 | Bendixen et al. | 455/554 |
| 4,959,851 | 9/1990 | Tobolski et al. | |
| 5,724,656 | * 3/1998 | Vo et al. | 455/422 |
| 5,953,676 | * 9/1999 | Berry et al. | 455/564 |
| 5,963,875 | * 10/1999 | Go | 455/564 |
| 6,073,028 | * 6/2000 | Humphrey et al. | 455/553 |
| 6,173,193 | * 1/2001 | Bright | 455/563 |

FOREIGN PATENT DOCUMENTS

| | | |
|---|---|---|
| 98/56193 | * 12/1998 | (SE) . |
| WO 96/32824 | 10/1996 | (WO) . |
| WO 97/20445 | 6/1997 | (WO) . |
| WO 98/56193 | 12/1998 | (WO) . |
| 99/04732 | 6/1999 | (WO) . |

OTHER PUBLICATIONS

Serrano v. Telular Corp, CAFC USPQ2d 1538, decided Apr. 25, 1997;"BNA's IPL on CD".*

* cited by examiner

Primary Examiner—Dwayne Bost
Assistant Examiner—Charles Craver
(74) Attorney, Agent, or Firm—Jenkens & Gilchrist, P.C.

(57) ABSTRACT

A fixed cellular system including a telephone unit, interface and a fixed cellular terminal is disclosed. A telephone unit enables the generation of a sequence of digits in response to a user input. The sequence of digits are forwarded to a system interface wherein a send command is attached to each digit generated by the telephone unit. The digits with attached send commands are forwarded to a fixed cellular terminal responsive to the send commands such that receipt of a send command delays initiation of calls to destinations associated with the sequence of digits for a predetermined period of time.

13 Claims, 2 Drawing Sheets

CELLULAR PHONE WITH CANCEL FUNCTION FOR FIXED TERMINAL DIALING

BACKGROUND OF THE INVENTION

1. Technical Field of the Invention

The present invention relates to cellular telephone systems and, in particular, to a fixed cellular communications system.

2. Description of Related Art

Most people who already have telephone service take their telephone service for granted. They do not realize that in many locations telephone service is a limited resource, and that service providers are often hard pressed to offer that service to all who desire it. Wire-based telephone service providers simply cannot keep up with the recent surge in demand for telephone service. While a large portion of this demand can be traced to the increased use of facsimile machines (which each may require a separate telephone number), an equally significant source of demand can be traced to the increased numbers of people who now want and can afford telephone service. Many times, the increases in population and accompanying increases in demand for telephone service occur in areas where the existing wirebased telephone system infrastructure is either inadequate to handle the increased demand or is completely nonexistent. In such cases, people must wait for the service provider to take the steps needed to establish the required telephone system and catch-up with the demand. Waits as long as several months for a new telephone number, and several years for the installation of wire-based telephone systems having adequate capacity, are not uncommon in heavily populated cities or remote locations.

The planning costs involved in expanding existing or initiating new wire-based telephone systems are enormous when you consider the need for both the acquisition of rights of way and the renovation or construction of the service providing infrastructure (comprising, for example, the switching networks and the laying or stringing of telephone cable). However, before making these expenditures, wire-based telephone service providers must know (or be able to accurately project) exactly where their customers will be located, how many customers will be there, and when they are going to arrive and need the service. It is often the case that service providers act in a reactionary rather and proactive manner with respect to subscriber demand, and are accordingly not prepared to meet the increases in demand in a timely fashion. This failure is caused primarily by the significant time delay experienced from the point of approving the provision of a wire-based telephone system and its actual installation and placement into operation. These delays have caused telephone service providers to re-think the use of conventional wire-based telephone systems when addressing pending needs for telephone service initiation or expansion.

Cellular telephone systems provide an attractive alternative to conventional wire-based telephone systems, especially in connection with the provision of new or expanded telephone service in heavily populated or remote areas where significant increases in demand are or have been encountered. The expense, aggravation and time involved in acquiring rights of way and establishing the infrastructure to provide telephone service are obviated or substantially reduced with the installation and use of a cellular telephone system. However, the cost to the subscriber on a monthly or per call basis often drastically exceeds the cost for similar activities incurred with respect to wire-based telephone systems. Furthermore, the mobility advantage of cellular telephone systems, which is accounted for in the increased subscriber cost of the service, is often a feature that many telephone service users do not want to pay for or necessarily need.

Accordingly, efforts have been made to couple cellular systems with conventional analog telephones and provide a hybrid telephone system wherein telephone sets are fixed at certain locations as in a wire-based system but instead access the telephone network using radio frequency communications in a cellular environment. Such systems, conventionally referred to as fixed cellular systems, interface a conventional analog telephone set, like that used in wire-based telephone systems, with a radio frequency transceiver, like that used in a mobile telephone, operating within a cellular telephone system. The primary advantages of fixed cellular systems are the elimination of the costs and hassles of acquiring rights of way and laying or stringing telephone cables, and the ease and swiftness with which the system may be installed and made operational. The availability of a fixed cellular system thus offers service providers a tool for quickly reacting to increases in demand at a reasonable provider and subscriber expense.

In spite of the fact that the subscriber's communication device (telephone set) looks like a conventional analog wire-based telephone set, in a fixed cellular system the telephone set unfortunately operates like a cellular mobile telephone, and thus suffers from the known caller interface disadvantages and inconveniences experienced with cellular service. For example, when a call is to be initiated in a fixed cellular system, the phone number must be first completely dialed into in the telephone set through the keypad and then sent to the cellular system for processing. No instantaneous feedback is provided to the caller during the dialing operation concerning the propriety of the entered numbers. The transmission of the dialed number over the cellular network is made only after the activation by the caller of a send button on the keypad. The caller must then wait while the cellular network side of the system selects the voice channel to carry the conversation and completes the call to the called party. The fixed cellular system caller interface accordingly and undesirably operates more slowly relative to, and in a manner completely foreign to the manner of operation experienced in, a conventional wire-based telephone system.

Efforts have been made to have the fixed cellular system mimic operation of the wire-based telephone system with respect to some aspects of the caller interface. For example, it is known to include functionality for simulating at the cellular system interface the dial tone and reorder tones heard on conventional wire-based systems before and during the caller dialing operation. With these features, the analog telephone set connected to a fixed cellular system operates more like a conventional wire-based telephone set than a cellular mobile station. However, improvements in this caller interface are still needed with respect to the speed with which the connection to the called party is established. Furthermore, there would be an advantage if the caller interface also functioned to monitor the propriety of the caller dialed numbers during the dialing operation.

SUMMARY OF THE INVENTION

The present invention overcomes the foregoing and other problems with a fixed cellular system enabling call connection between a standard telephone unit and a fixed cellular terminal. A standard telephone unit enables the generation of a sequence of digits associated with a particular calling destination in response to user input. The standard telephone unit is connected to a system interface that attaches a send command to each of the generated digits of the sequence of digits. The generated digits along with the attached send command are forwarded to a fixed cellular terminal enabling connection to a calling destination associated with the sequence of digits.

A timer within the fixed cellular terminal is responsive to a send command attached to a digit. Upon receipt of a send command attached to a digit the outgoing call initiated by the sequence of digits is delayed for a predetermined period of time. After each receipt of a send command, the fixed cellular terminal monitors for receipt of a subsequent send command or digits and reinitiates the timer if a subsequent send command or digits are detected. If subsequent digits are received, the current send command is canceled. Otherwise, the outgoing call is initiated upon expiration of the predetermined period of time with no receipt of a subsequent send command or digits. The timer is programmable such that the predetermined period of time may be adjusted as desired by the user.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF THE DRAWINGS

Figure 1:
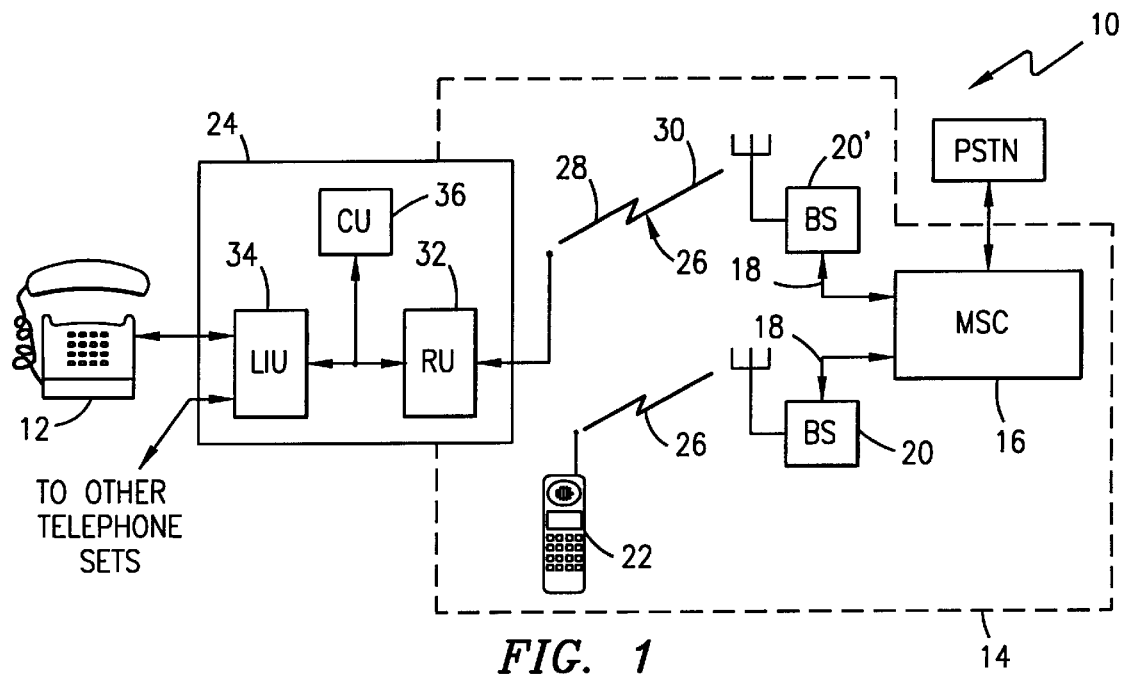
FIG. 1 is a block diagram of a fixed cellular telephone system.

Reference is now made to FIG. 1 wherein there is shown a block diagram of a fixed cellular telephone system 10 in accordance with the present invention. A standard telephone set 12 of the DTMF tone dial variety is connected for operation to a cellular telephone network 14. The cellular telephone network 14 comprises a mobile switching center (MSC) 16 connected by communications links 18 to a plurality of base stations (BS) 20. The connection between the standard telephone set 12 and the cellular telephone network 14 is made through a fixed cellular terminal 24 operating to establish radio frequency communications links with a proximately located base station 20'.

The radio frequency communications links established between the base stations 20 and any cellular mobile stations 22, and between the base station 20' and the fixed cellular terminal 24 are effectuated over an air interface 26 comprising at least one control channel (CC) 28 and a plurality of voice channels (VC) 30 per base station. The control channels 28 comprise bi-directional communications channels for carrying command and control signals between the base stations 20 and the mobile stations 22, and between the base station 20' and the fixed cellular terminal 24. The voice channels 30, on the other hand, comprise bi-directional communications channels for carrying voice communications between the base stations 20 and the mobile stations 22, and between the base station 20' and the fixed cellular terminal 24. Any type of cellular network air interface 26 that provides for both control and voice channels 28 and 30, respectively, may be utilized by the cellular telephone network 14, including those air interfaces specified for use in the well known AMPS, D-AMPS and GSM cellular telephone systems. The control channels or voice channels in the air interface 26 may therefore comprise either or both a certain radio frequency carrier in an analog cellular telephone system and/or a certain time slot provided within a carrier in a digital cellular telephone system, and the fixed cellular terminal may operate in either or both an analog or digital mode, respectively.

The fixed cellular terminal 24 operates as an interface between one or more standard telephone sets 12 and the cellular network 14. When operable as a multiline terminal, the fixed cellular terminal 24 functions like a private branch exchange (PBX) to allow a plurality of subscriber telephone sets at one general location (for example, a business or a small town) to be provided with fixed cellular telephone service. As a single-line terminal, on the other hand, the fixed cellular terminal 24 provides a connection for a single subscriber telephone set at one given location (for example, a house). The fixed cellular terminal 24 may accordingly comprise either the Single-line or Multi-line Terminal manufactured by Ericsson for the CMS 8800 AMPS/D-AMPS Fixed Cellular telephone system configured in accordance with the present invention to provide an improved caller interface as will be described.

The fixed cellular terminal 24 comprises a radio unit (RU) 32, a line interface unit (LIU) 34 and a control unit (CU) 36. The radio unit 32 provides all the radio frequency communications functionality typically found in a mobile station 22 for a cellular telephone system. Thus, the radio unit 32 includes a tunable radio frequency transceiver device for accessing the radio frequency carriers (and the digital cellular system TDMA or CDMA time slots therein if applicable) for the control channels 28 and voice channels 30 provided within the air interface 26. The line interface unit 34 provides the functionality for interfacing the one or more connected standard telephone sets 12 to the radio unit 32. The control unit 36 manages the operation of the radio unit 32 and the line interface unit 34 to provide the signal conversions required to establish and terminate calls to and from the line interface unit 34 through the cellular network 14. The control unit 36 further manages all the necessary information required for establishing and authenticating calls over the cellular network 14.

Figure 2:
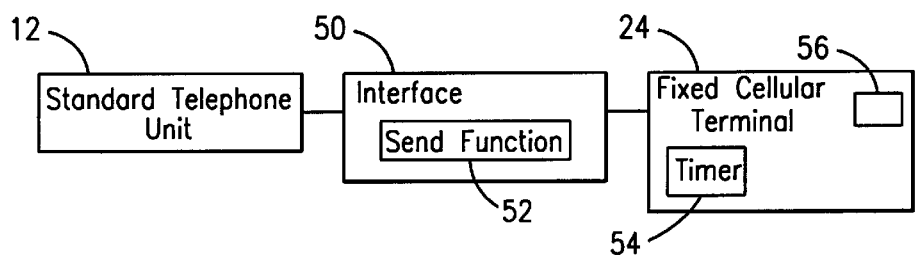
FIG. 2 is a functional block diagram of the interface system of the present invention between a standard telephone unit and a fixed cellular terminal.

Referring now to FIG. 2, there is more particularly illustrated a functional block diagram of the interface system 50 of the present invention enabling call dialing between a standard telephone set 12 and fixed cellular terminal 24. The standard telephone unit 12 comprises an analog or digital telephone unit enabling a user to enter the digits of a telephone number to initiate a call to a destination number. The entered digits are transmitted to the interface system 50 wherein each digit of the entered number has appended thereto a "send command" by a send function 52. This process is repeated for each digit dialed by the user at the standard telephone unit 12. Thus, the interface system 50 would generate a sequence as follows in response to the entry of the digits 472.

4 "send"

7 "send"

2 "send"

The digits including the appended send command are forwarded to the fixed cellular terminal 24, either singularly or as a group. Each time a send command is received by the fixed cellular terminal 24, a timer 54 is initiated. The timer 54 is programmed with a selected delay value. In a preferred embodiment, the delay value is 3 seconds. If any additional digits including an appended send command are received at the fixed cellular terminal 24 within the three second timer period, the timer 54 is reset to another three second period. In this way, the outgoing call is not initiated from the fixed cellular terminal 24 until the last digit entered by the user at the standard telephone unit 12 has been received, and the three second time period initiated by the appended send command to the last digit has lapsed. The fixed cellular terminal may also include an interface 56 for entering information to initiate an outgoing call via digits and a send command.

In the present invention, the interface system 50 is not attempting to determine when the last digit is dialed, nor is the interface system performing any number analysis. The interface system 50 merely transfers each digit and appends a send command to the digit. Likewise, the fixed cellular terminal 24 does not analyze received digits. It merely includes a built-in escape clause that allows the user to cancel a call within three seconds of entry or receipt of a send command.

Figure 3:
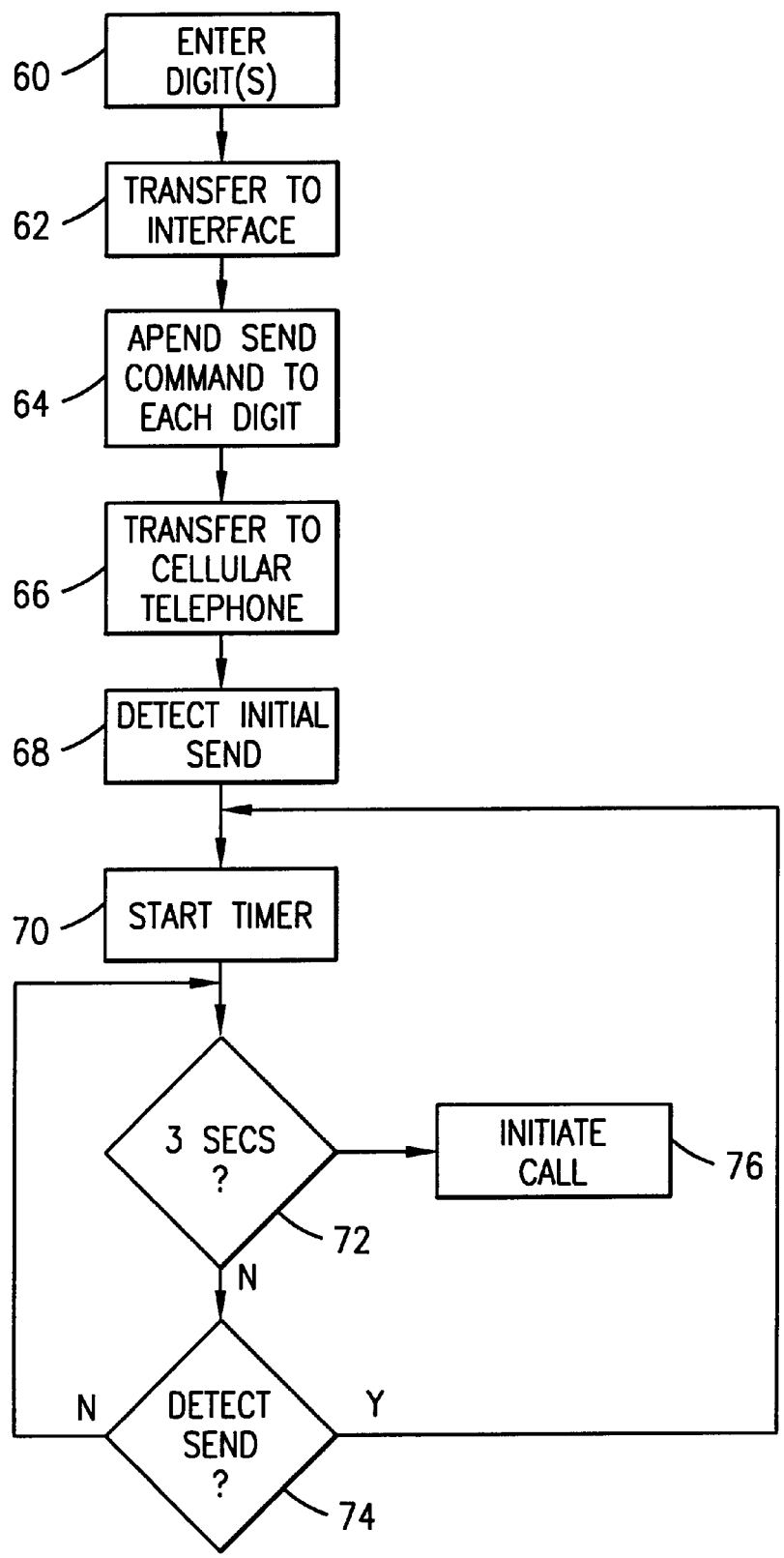
FIG. 3 is a flow diagram illustrating the method of the present invention.

Referring now to FIG. 3, there is illustrated a flow diagram of the process for dialing an outgoing call according to the present invention. Initially, at step 60, the user enters a digit or digits associated with the destination number of the outgoing call. The digit or digits are transferred at step 62 to the interface system 50. At the interface system, the send function 52 appends at step 64 a send command to each received digit.

The sequence of digits including the appended send commands are transferred at step 66 to the fixed cellular terminal 24 associated with a standard telephone unit 12. Upon receipt of the initial send command at step 68, the timer 54 is initiated at step 70. Inquiry step 72 monitors the execution of a three second time period by the timer 54. If the three second time period has not elapsed, inquiry step 74 searches for a next send command associated with another digit. If an additional send command is detected at step 74, control passes back to step 70 and the timer is reset. Once the three second time period expires at step 72, the call is initiated at step 76 by the fixed cellular terminal 24 to the destination number.

Although a preferred embodiment of the method and apparatus of the present invention has been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed is:

1. A call connection method for a fixed cellular system, comprising the steps of:

entering a sequence of digits at a standard telephone unit;
   transferring the sequence of digits to an interface system;
   attaching at the interface system a send command for initiating an outgoing call to each digit of the sequence of digits; and
   transferring the sequence of digits having the attached send commands for initiating an outgoing call from the interface system to a fixed cellular terminal,
   initiating an outgoing call from the fixed cellular terminal associated with the standard telephone unit upon expiration of a predetermined time period after receipt of a final send command for initiating an outgoing call at the fixed cellular terminal.

2. The method of claim 1, wherein step of initiating further includes the steps of:

activating a timer upon detection of a first send command attached to first digit received at the fixed cellular terminal;
   monitoring for receipt of a second send command attached to a second digit received at the fixed cellular terminal during the predetermined period of time;
   reinitiating the timer if the second send command is detected during the predetermined time period; and
   initiating the outgoing call from the fixed cellular terminal if the second send command is not detected during the predetermined time period.

3. The method of claim 1, further including the step of:
   programming the predetermined time period to a desired length.

4. A fixed cellular system, comprising:

a telephone unit for generating a sequence of digits in response to user input;
   an interface for attaching a send command for initiating an outgoing call to each digit generated by the telephone unit; and
   a fixed cellular unit for connecting the user with a destination associated with the sequence of digits having the attached send commands received from the interface.

5. The system of claim 4, wherein the fixed cellular unit further comprises:

a timer responsive to a send command attached to a digit for delaying initiation of the connection to the destination for a predetermined period of time, the timer further delaying initiation in response to a subsequent send command for the predetermined period of time.

6. The system of claim 5, wherein the timer may be programmed to alter the predetermined period of time.

7. A fixed cellular system, comprising:

a telephone unit for generating a sequence of digits in response to a user input;
   a fixed cellular unit for delaying initiation of a call to a destination associated with the sequence of digits for a predetermined period of time upon receipt of a send command for initiating an outgoing call attached to a digit, the fixed cellular unit further delaying initiation of a call for the predetermined period of time upon receipt of a subsequent send command for initiating an outgoing call; and
   a system interface interconnecting the telephone unit with the fixed cellular unit for attaching the send command for initiating an outgoing call to each digit generated by the telephone unit.

8. The system of claim 7, wherein the fixed cellular unit further comprises:

a timer responsive to a send command attached to a digit for timing the delay of initiation of the connection to the destination for the predetermined period of time.

9. The system of claim 8, wherein the timer may be programmed to alter the predetermined period of time.

10. A cellular telephone unit, comprising:

a timer initiated in response to a send command for initiating an outgoing call to delay initiation of a call for a predetermined period of time, the timer further responsive to a further send command for initiating an outgoing call to reset the timer to reinitiate the predetermined period of time; and
   an input for receiving information and the send command for initiating the outgoing call.

11. The system of claim 10, wherein the timer cancels a current send command in response to entry of a digit.

12. The system of claim 10, wherein the timer may be programmed to alter the predetermined period of time.

13. A cellular apparatus, comprising:

a fixed cellular unit for delaying initiation of a call to a destination associated with at least one digit for a predetermined period of time upon receipt of a send command for initiating an outgoing call attached to a digit, the fixed cellular unit further delaying initiation of a call for the predetermined period of time upon receipt of a subsequent send command for initiating an outgoing call; and a system interface interconnecting a standard telephone unit with the fixed cellular unit for attaching the send command for initiating an outgoing call to digits received from the telephone unit.

\* \* \* \* \*